(12) United States Patent
Wikander et al.

(10) Patent No.: US 9,309,707 B2
(45) Date of Patent: Apr. 12, 2016

(54) HINGE ASSEMBLY FOR ELECTRONIC DEVICE

(71) Applicant: Intel Corporation, Santa Clara, CA (US)

(72) Inventors: Jered H. Wikander, Portland, OR (US); Nathaniel B. Osterberg, Cove, OR (US); Douglas Heymann, Hillsboro, OR (US); Shawn S. Mceuen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/142,802

(22) Filed: Dec. 28, 2013

(65) Prior Publication Data

US 2015/0184437 A1    Jul. 2, 2015

(51) Int. Cl.
*E05D 7/00*    (2006.01)
*E05D 3/06*    (2006.01)
*G06F 1/16*    (2006.01)

(52) U.S. Cl.
CPC ............... *E05D 7/0045* (2013.01); *E05D 3/06* (2013.01); *G06F 1/16* (2013.01); *Y10T 16/541* (2015.01)

(58) Field of Classification Search
CPC ....... G06F 1/168; G06F 1/1681; G06F 1/547; G06F 1/1616; E05Y 2900/602; E05Y 2900/606; H04M 1/022; E05D 3/12; E05D 3/122; Y10T 16/541
See application file for complete search history.

(56) References Cited

U.S. PATENT DOCUMENTS

| | | | | |
|---|---|---|---|---|
| 2,556,490 A * | 6/1951 | Chamberlin | ....................... | 8/159 |
| 2,890,476 A * | 6/1959 | Lustig | .............. | 16/288 |
| 3,697,148 A * | 10/1972 | Weber | ........... | 312/268 |
| 4,865,577 A * | 9/1989 | Freudenstein | ................ | 474/141 |
| 5,542,145 A * | 8/1996 | Buchanan et al. | .......... | 15/250.16 |
| 5,549,314 A * | 8/1996 | Sassi et al. | ...................... | 280/259 |
| 5,867,872 A * | 2/1999 | Katoh | .............. | 16/337 |
| 5,882,025 A * | 3/1999 | Runnels | ........................ | 280/259 |
| 5,987,704 A | 11/1999 | Tang | | |
| 6,191,937 B1 * | 2/2001 | Bang | ......................... | 361/679.23 |
| 6,402,711 B1 * | 6/2002 | Nauert | .............................. | 602/16 |
| 7,044,875 B2 * | 5/2006 | Gajewski | ........................ | 474/148 |
| 2002/0038493 A1 * | 4/2002 | Ko et al. | .......................... | 16/303 |

(Continued)

FOREIGN PATENT DOCUMENTS

WO    2009099275 A2    8/2009

OTHER PUBLICATIONS

International Search Report and Written Opinion received for International Application No. PCT/US2014/067350, mailed on Feb. 16, 2015.

*Primary Examiner* — Chuck Mah
(74) *Attorney, Agent, or Firm* — Alpine Technology Law Group LLC

(57) ABSTRACT

In one embodiment a hinge assembly comprises a first hinge pin rotatable about a first axis, a first gear coupled to the first hinge pin and rotatable about the first axis, a second hinge pin rotatable about a second axis substantially parallel to the first axis, a second gear coupled to the second hinge pin and rotatable about the second axis, at least one connecting member to be coupled to the first hinge pin and the second hinge pin to hold the first hinge pin at a fixed distance from the second hinge pin such that the first gear is engaged with the second gear. At least one of the first gear or the second gear comprises a variable radius. Other embodiments may be described.

14 Claims, 7 Drawing Sheets

(56) References Cited

U.S. PATENT DOCUMENTS

| | | |
|---|---|---|
| 2003/0226238 A1 | 12/2003 | Baer |
| 2005/0122671 A1* | 6/2005 | Homer ............................ 361/681 |
| 2005/0155182 A1* | 7/2005 | Han et al. ......................... 16/336 |
| 2006/0238970 A1* | 10/2006 | Ukonaho et al. ............... 361/683 |
| 2007/0054710 A1* | 3/2007 | Pan ............................ 455/575.3 |
| 2008/0284295 A1* | 11/2008 | Lai et al. ..................... 312/223.2 |
| 2008/0307608 A1* | 12/2008 | Goto ................................ 16/366 |
| 2009/0241290 A1 | 10/2009 | Jones et al. |
| 2010/0071159 A1* | 3/2010 | Myung ............................ 16/303 |
| 2010/0283367 A1* | 11/2010 | Coleman et al. ............... 312/405 |
| 2012/0147535 A1* | 6/2012 | Ahn et al. ................. 361/679.01 |
| 2012/0162864 A1 | 6/2012 | Wikander et al. |
| 2012/0276519 A1* | 11/2012 | Kravitz et al. .................. 435/1.2 |
| 2013/0076216 A1* | 3/2013 | Schmitz et al. ................ 312/308 |

* cited by examiner

HINGE ASSEMBLY FOR ELECTRONIC DEVICE

BACKGROUND

The subject matter described herein relates generally to the field of electronic devices and more particularly to a hinge assembly for one or more electronic devices.

Some electronic devices utilize a "clamshell" housing. By way of example, many laptop computers and mobile electronic devices utilize a clamshell housing in which a keyboard is disposed on a first section and a display is disposed on a second section coupled to the first section by a hinge. Alternatively, a "clamshell" can consist of displays, one on a first section that can also be utilized as a touch keyboard and one display on a second section coupled to the first section by a hinge.

Accordingly hinge assemblies for clamshell housings may find utility.

BRIEF DESCRIPTION OF THE DRAWINGS

The detailed description is described with reference to the accompanying figures.

DETAILED DESCRIPTION

Described herein are exemplary hinge assemblies to enable the rotation of components of a clamshell housing which may be used with an electronic device. In the following description, numerous specific details are set forth to provide a thorough understanding of various embodiments. However, it will be understood by those skilled in the art that the various embodiments may be practiced without the specific details. In other instances, well-known methods, procedures, components, and circuits have not been illustrated or described in detail so as not to obscure the particular embodiments.

The subject matter described herein addresses the issues addressed above by providing a hinge assembly which may be incorporated into a housing for an electronic device. In one aspect, the hinge assembly is configured to provide a relatively low rotational resistance when the electronic device is in or near a closed configuration, but a higher rotational resistance when the electronic device is opened within an angular range appropriate for viewing and/or interaction with a touch screen. For example, the hinge assembly may include two hinges which rotate about parallel axes. The hinges include interlocking gears, both of which have a variable radius at different points about its circumference such that the gear ratio of the hinge assembly changes as the gears rotate. The gears may be configured such that the gear assembly offers only moderate resistance when the display is within relatively small angular range of being closed (e.g., between zero degrees and about 50 degrees). However, as the hinge assembly is opened further the gear ratio changes such that the display offers greater resistance when the display is within an angular range appropriate for viewing (e.g., between about 70 degrees and 120 degrees).

In another aspect the gears may be configured such that the clamshell housing may be rotated through a full 360 degrees of rotation such that the display section of the electronic device can be fully rotated about the base section to configure the electronic device as a tablet. In this configuration the gears may be configured such that the gear assembly offers moderate resistance when passing through the range of unlikely angles of operation (e.g., between 160 and 200 degrees). This allows for easy conversion into a tablet mode or tent mode (where the keyboard and screen are) facing the outside of an inverted clamshell.

Details about various configurations are described with reference to FIGS. 1-7, below.

Figure 1:
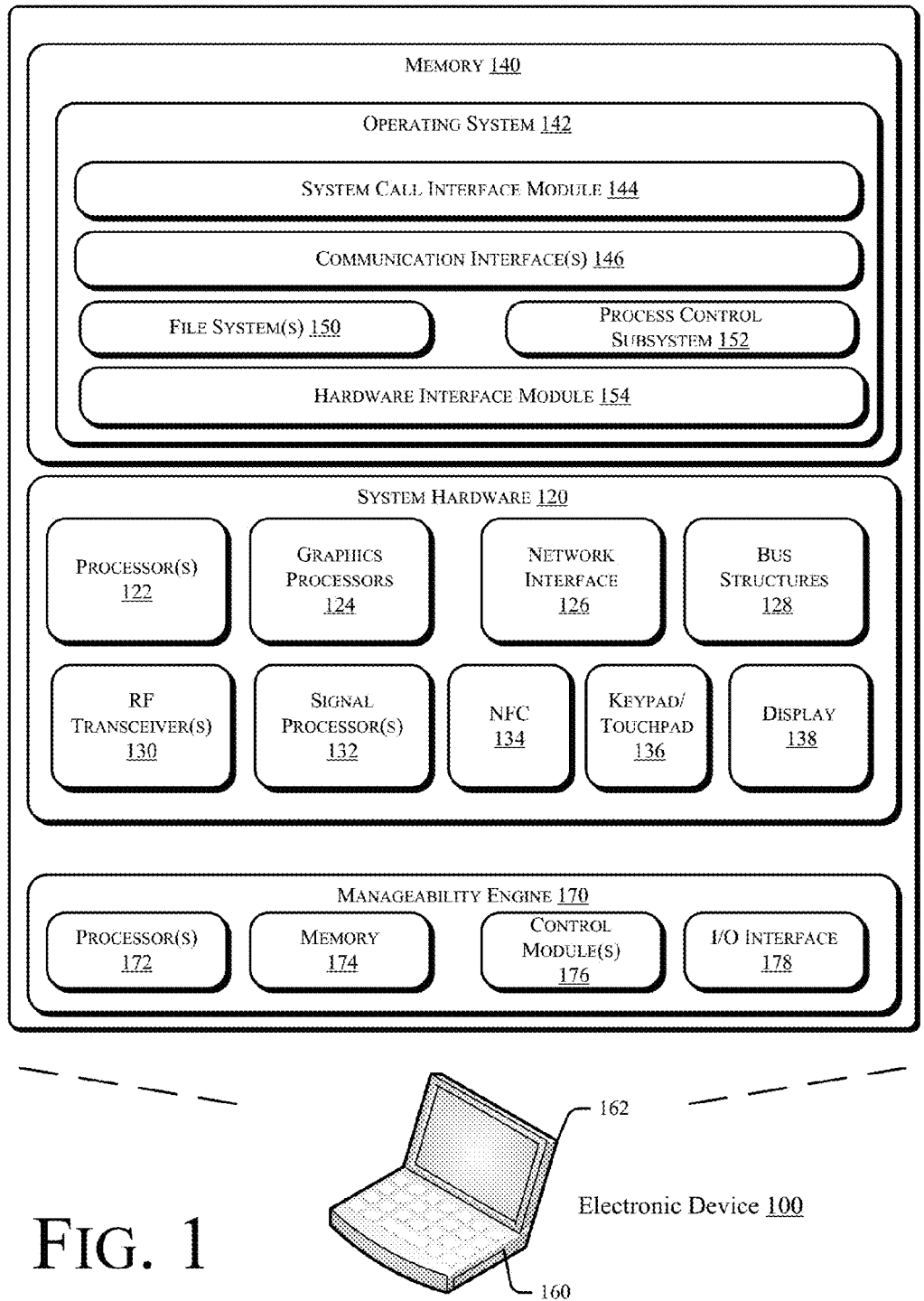
FIG. 1 is a schematic illustration of an exemplary electronic device which may include a hinge assembly in accordance with some embodiments.

FIG. 1 is a schematic illustration of an exemplary electronic device 100 which may be adapted to include a hinge assembly in accordance with some embodiments. As illustrated in FIG. 1, electronic device 100 may be embodied as a conventional mobile device such as a laptop computer, a mobile phone, tablet computer portable computer, or personal digital assistant (PDA). The particular device configuration is not critical.

In various embodiments, electronic device 100 may include or be coupled to one or more accompanying input/output devices including a display, one or more speakers, a keyboard, one or more other I/O device(s), a mouse, a camera, or the like. Other exemplary I/O device(s) may include a touch screen, a voice-activated input device, a track ball, a geolocation device, an accelerometer/gyroscope, biometric feature input devices, and any other device that allows the electronic device 100 to receive input from a user.

The electronic device 100 includes system hardware 120 and memory 140, which may be implemented as random access memory and/or read-only memory. A file store may be communicatively coupled to electronic device 100. The file store may be internal to electronic device 100 such as, e.g., eMMC, SSD, one or more hard drives, or other types of storage devices. File store 180 may also be external to electronic device 100 such as, e.g., one or more external hard drives, network attached storage, or a separate storage network.

System hardware 120 may include one or more processors 122, graphics processors 124, network interfaces 126, and bus structures 128. In one embodiment, processor 122 may be embodied as an Intel® Atom™ processors, Intel® Atom™ based System-on-a-Chip (SOC) or Intel® Core2 Duo® or i3/i5/i7 series processor available from Intel Corporation, Santa Clara, Calif., USA. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 124 may function as adjunct processor that manages graphics and/or video operations. Graphics processor(s) 124 may be integrated onto the motherboard of electronic device 100 or may be coupled via an expansion slot on the motherboard or may be located on the same die or same package as the Processing Unit.

In one embodiment, network interface 126 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 128 connect various components of system hardware 128. In one embodiment, bus structures 128 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI), a High Speed Synchronous Serial Interface (HSI), a Serial Low-power Inter-chip Media Bus (SLIMbus®), or the like.

Electronic device 100 may include an RF transceiver 130 to transceive RF signals, a Near Field Communication (NFC) radio 134, and a signal processing module 132 to process signals received by RF transceiver 130. RF transceiver may implement a local wireless connection via a protocol such as, e.g., Bluetooth or 802.11X. IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a WCDMA, LTE, general packet radio service (GPRS) interface (see, e.g., Guidelines on GPRS Handset Requirements, Global System for Mobile Communications/GSM Association, Ver. 3.0.1, December 2002).

Electronic device 100 may further include one or more input/output interfaces such as, e.g., a keypad 136 and a display 138. In some embodiments electronic device 100 may not have a keypad and use the touch panel for input.

Memory 140 may include an operating system 142 for managing operations of electronic device 100. In one embodiment, operating system 142 includes a hardware interface module 154 that provides an interface to system hardware 120. In addition, operating system 140 may include a file system 150 that manages files used in the operation of electronic device 100 and a process control subsystem 152 that manages processes executing on electronic device 100.

Operating system 142 may include (or manage) one or more communication interfaces 146 that may operate in conjunction with system hardware 120 to transceive data packets and/or data streams from a remote source. Operating system 142 may further include a system call interface module 144 that provides an interface between the operating system 142 and one or more application modules resident in memory 130. Operating system 142 may be embodied as a UNIX operating system or any derivative thereof (e.g., Linux, Android, etc.) or as a Windows® brand operating system, or other operating systems.

In some embodiments an electronic device may include a manageability engine 170, which may comprise one or more controllers that are separate from the primary execution environment. The separation may be physical in the sense that the manageability engine may be implemented in controllers which are physically separate from the main processors. Alternatively, the trusted execution environment may logical in the sense that the manageability engine may be hosted on same chip or chipset that hosts the main processors.

By way of example, in some embodiments the manageability engine 170 may be implemented as an independent integrated circuit located on the motherboard of the electronic device 100, e.g., as a dedicated processor block on the same SOC die. In other embodiments the trusted execution engine may be implemented on a portion of the processor(s) 122 that is segregated from the rest of the processor(s) using hardware enforced mechanisms In the embodiment depicted in FIG. 1 the manageability engine 170 comprises a processor 172, a memory module 174, a control module 176, and an I/O interface 178. In some embodiments the memory module 174 may comprise a persistent flash memory module and the various functional modules may be implemented as logic instructions encoded in the persistent memory module, e.g., firmware or software. The I/O module 178 may comprise a serial I/O module or a parallel I/O module. Because the manageability engine 170 is separate from the main processor(s) 122 and operating system 142, the manageabilty engine 170 may be made secure, i.e., inaccessible to hackers who typically mount software attacks from the host processor 122.

In some embodiments the electronic device 100 may comprise a hinge assembly which enables the first section 160 and the second section 162 to be rotatable between a first position in which the second section 162 is parallel with a first side of the first section 160 and a second position in which the second section is fully rotated about the first section, such that the second section 162 is parallel with a second side of the first section 160. In embodiments in which the second section includes a single display the first position may correspond to the electronic device being in a closed configuration and the second position may correspond to the electronic device being in an open configuration which may be suitable for use as a tablet device.

Figure 2A:
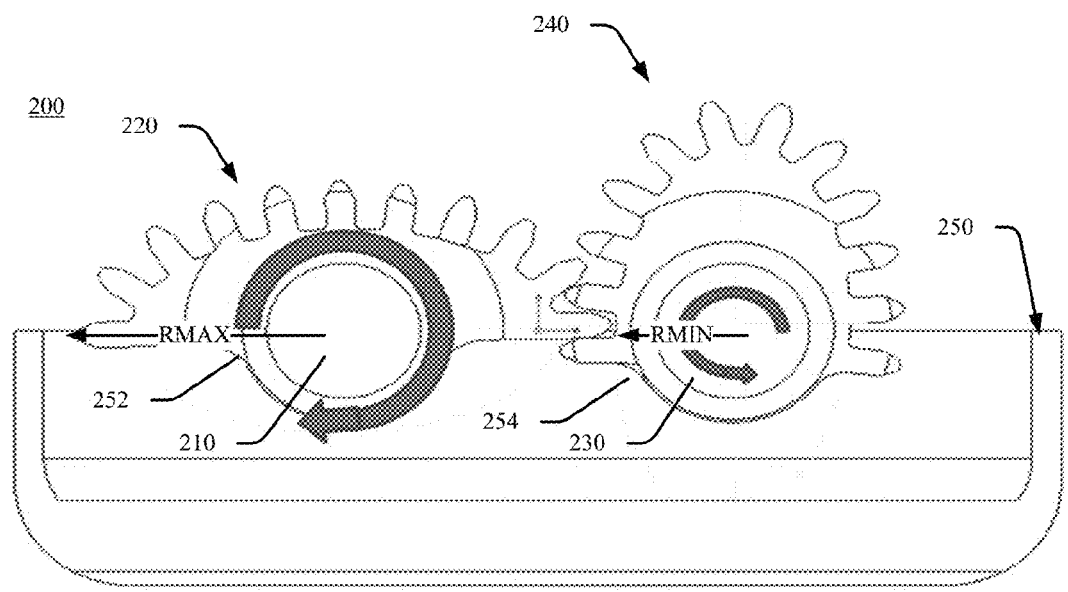
FIGS. 2A-2B are schematic illustrations of a hinge assembly in accordance with some embodiments.
Figure 2B:
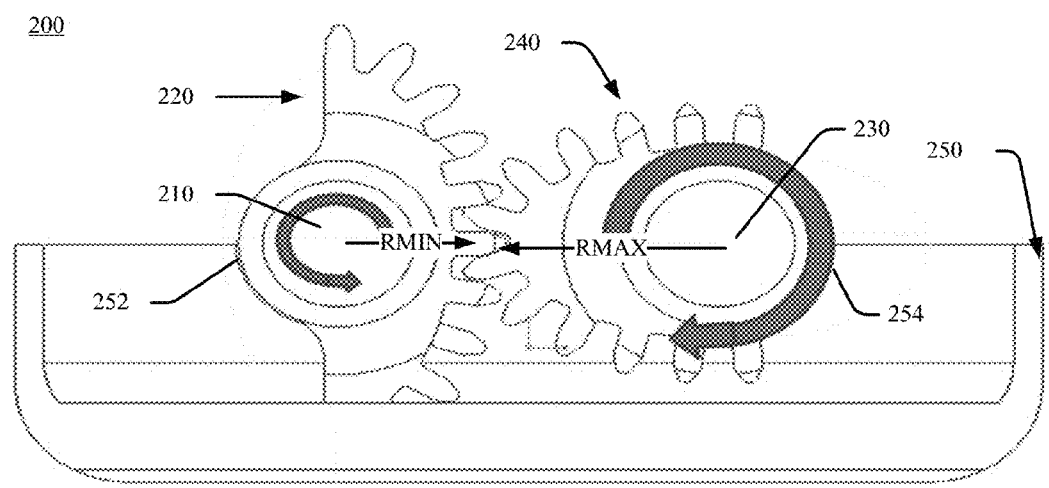
Figure 3:
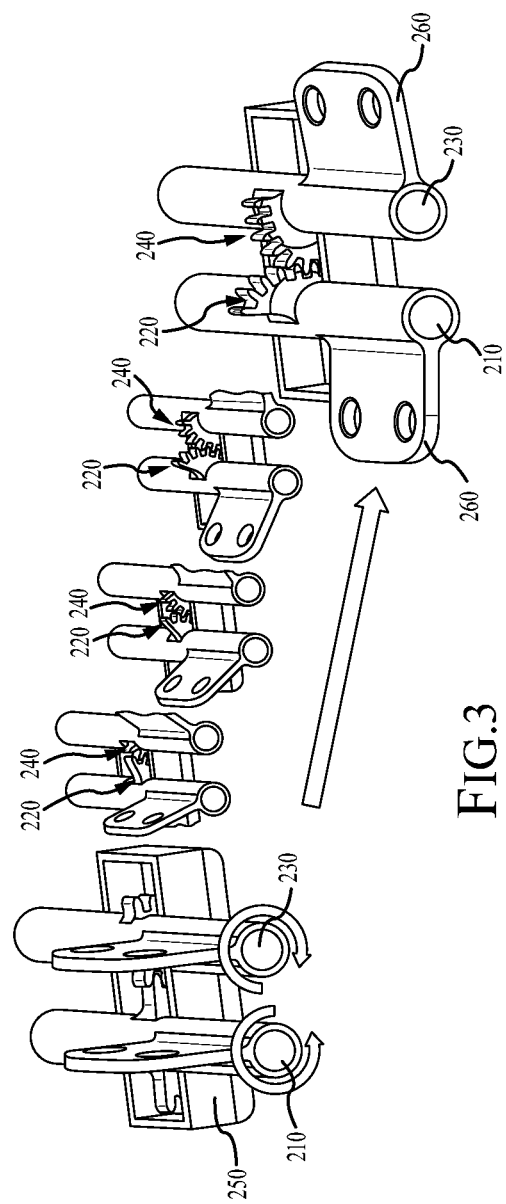
FIG. 3 is a schematic illustration of a hinge assembly in various rotational orientations in accordance with some embodiments.

Embodiments of a hinge assembly will be described with reference to FIGS. 2A-2B and FIG. 3. FIGS. 2A-2B and FIG. 3 are schematic illustrations of a hinge assembly in accordance with some embodiments. Referring to FIGS. 2A-2B, in some embodiments a hinge assembly 200 comprises a first hinge pin 210 rotatable about a first axis and a first gear 220 coupled to the first hinge pin 210 and rotatable about the first axis. Hinge assembly 200 further comprises a second hinge pin 230 rotatable about a second axis substantially parallel to the first axis and a second gear 240 coupled to the second hinge pin 230 and rotatable about the second hinge axis. Hinge assembly 200 further comprises at least one connecting member 250 to be coupled to the first hinge pin 210 and the second hinge pin 230 to hold the axis of rotation of the first hinge pin 210 at a fixed distance from the axis of rotation of the second hinge pin 230 from the second hinge pin 230 such that the first gear 220 is engaged with the second gear 240. At least one of the first gear 220 or the second gear 240 comprises a variable radius.

As illustrated in FIG. 3, the hinge assembly 200 may further comprise a mounting bracket 260 coupled to the first hinge pin 210 and the second hinge pin 230. The mounting brackets connect to the lid and base of the clamshell respectively, e.g., the mounting bracket 260 that is connected to the first hinge pin 210 would be fastened to the lid by screws while the mounting bracket 260 that is connected to the second hinge pin 230 would be fastened to the base with screws. The connecting member 250 contains the hinge assembly as a single unit, acting as the bearing for both hinge pin 210 and 230. The connecting member 250 is cut in half for FIG. 3 to show the function of the assembly but would normally fully enclose the gear portion of the hinge. The connecting member 250 would also act as a housing to block any foreign objects from obstructing the gears during operation.

In various embodiments the hinge pins 210, 230 may be formed from a suitably rigid material, e.g., a metal, plastic, or composite material. As illustrated in FIGS. 2A-2B, the hinge pins 210, 230 may be substantially circular in cross section when taken from an end view. Similarly, the connecting member 250 may be formed form a suitably rigid material, e.g., a metal, plastic, or composite material. The connecting arm 250 may comprise indents 252, 254 which retain the hinge pins 210, 230 in a fixed distance relative to one another.

As best illustrated in FIGS. 2A-2B, in some examples the first gear 220 and the second gear 240 are both irregular in shape such that the first gear 220 comprises a first variable radius and the second gear 240 comprises a second variable radius. In the example depicted in FIGS. 2A-2B the first gear 220 and the second gear 240 are both generally oblong, or elliptical in shape.

The hinge pins 210, 230 are positioned in connecting member 250 such that when the hinge assembly is rotatable between a first position (FIG. 2A) having a first gear ratio between the first gear 220 and the second gear 240 and a second position (FIG. 2B) having a second gear ratio between the first gear 220 and the second gear 240. For example, in the first position depicted in FIG. 2A the second gear 240 exerts a relatively small torque on the first gear 220. However, as the hinge pins 210, 230 rotates from the first position depicted in FIG. 2A to the second position depicted in FIG. 2B the radius of the respective gears 220, 240 reverses such that the second gear 240 exerts a torque which is relatively larger than the torque exerted by first gear 220.

In some examples the first gear 220 has a first maximum radius and a first minimum radius and the ratio of the first maximum radius to the first minimum radius is within a range between 1.5:1.0 and 3.0:1.0. Similarly, the second gear 240 has a second maximum radius and a second minimum radius, and the ratio of the second maximum radius to the second minimum radius is within a range between 1.5:1.0 and 3.0:1.0. In one example the maximum radius of the gears of this version is around 8 mm and the minimum radius is around 4 mm.

The gear ratio between the first gear 220 and the second gear 240 changes continuously as the hinge assembly is rotated. In some examples, the gear ratio of the first gear 220 could go from 1:2 when it begins rotation from a closed position and progress toward a 2:1 ratio as it passes 180 degrees, then decline back to a 1:2 ratio. More generally, the hinge assembly is rotatable between a first position having a first gear ratio between the first gear 220 and the second gear 240 and a second position having a second gear ratio between the first gear 220 and the second gear 240. The first gear ratio is in a range between 1:4 and 1:1; and the second gear ratio is in a range between 1:1 and 1:4

Figure 4:
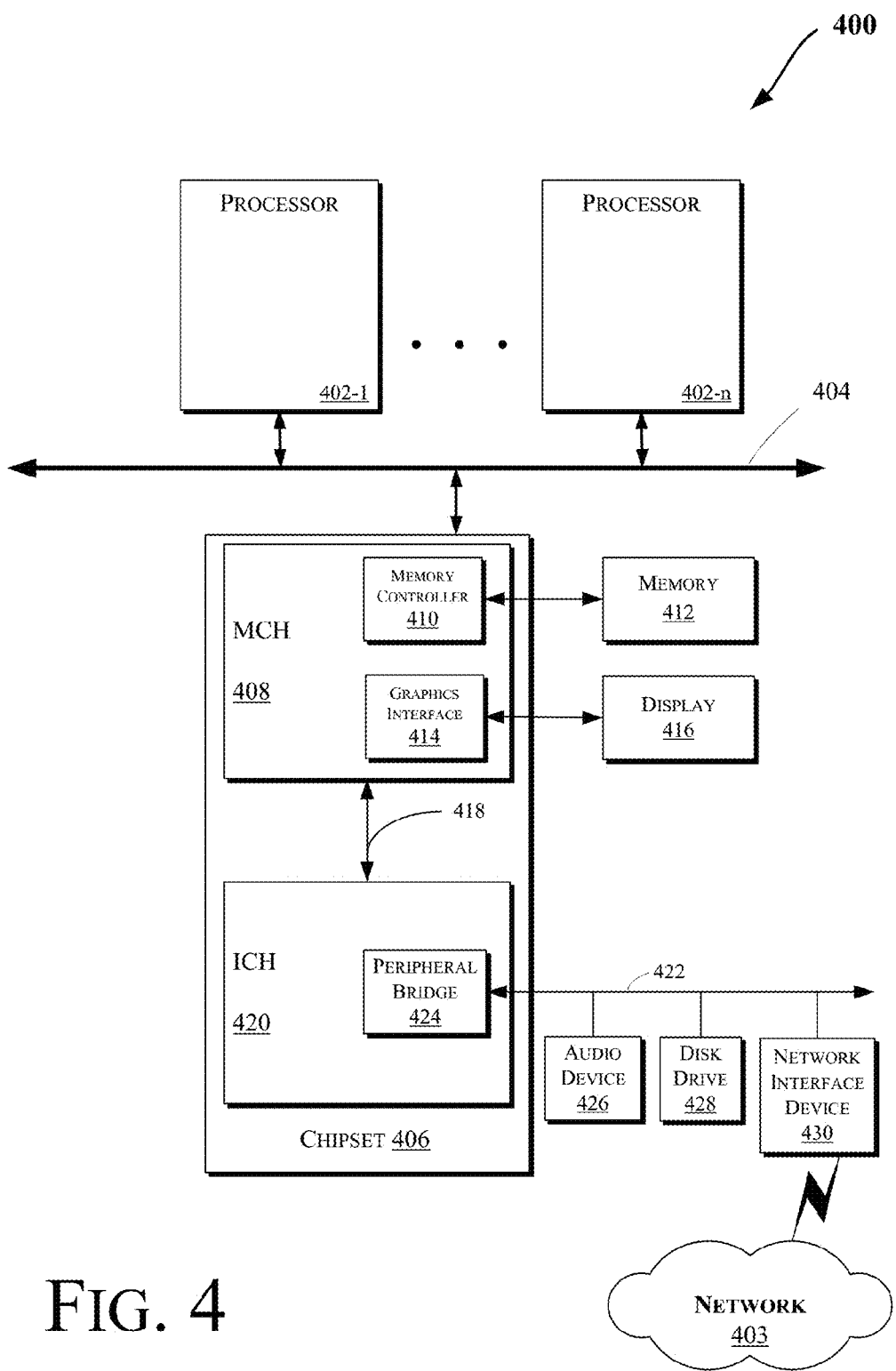
FIGS. 4-7 are schematic illustrations of electronic devices which may be modified to include a hinge assembly in accordance with some embodiments.

In some embodiments a hinge assembly as depicted in FIGS. 2A-2B and FIG. 3 may be incorporated into a housing for an electronic device, such as an electronic device 100 depicted in FIG. 1. FIGS. 4-7 are schematic illustrations of electronic devices which may incorporate a hinge assembly in accordance with some embodiments. In some embodiments the electronic device may be embodied as a computer system. FIG. 4 illustrates a block diagram of a computing system 400 in accordance with an embodiment of the invention. The computing system 400 may include one or more central processing unit(s) (CPUs) 402 or processors that communicate via an interconnection network (or bus) 404. The processors 402 may include a general purpose processor, a network processor (that processes data communicated over a computer network 403), or other types of a processor (including a reduced instruction set computer (RISC) processor or a complex instruction set computer (CISC)). Moreover, the processors 402 may have a single or multiple core design. The processors 402 with a multiple core design may integrate different types of processor cores on the same integrated circuit (IC) die. Also, the processors 402 with a multiple core design may be implemented as symmetrical or asymmetrical multiprocessors. In an embodiment, one or more of the processors 402 may be the same or similar to the processors 102 of FIG. 1. For example, one or more of the processors 402 may include the control unit 120 discussed with reference to FIGS. 1-3. Also, the operations discussed with reference to FIGS. 1-3 may be performed by one or more components of the system 400.

A chipset 406 may also communicate with the interconnection network 404. The chipset 406 may include a memory control hub (MCH) 408. The MCH 408 may include a memory controller 410 that communicates with a memory 412 (which may be the same or similar to the memory 114 of FIG. 1). The memory 412 may store data, including sequences of instructions, that may be executed by the CPU 402, or any other device included in the computing system 400. In one embodiment of the invention, the memory 412 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 404, such as multiple CPUs and/or multiple system memories.

The MCH 408 may also include a graphics interface 414 that communicates with a display device 416. In one embodiment of the invention, the graphics interface 414 may communicate with the display device 416 via an accelerated graphics port (AGP). In an embodiment of the invention, the display 416 (such as a flat panel display) may communicate with the graphics interface 414 through, for example, a signal converter that translates a digital representation of an image stored in a storage device such as video memory or system memory into display signals that are interpreted and displayed by the display 416. The display signals produced by the display device may pass through various control devices before being interpreted by and subsequently displayed on the display 416.

A hub interface 418 may allow the MCH 408 and an input/output control hub (ICH) 420 to communicate. The ICH 420 may provide an interface to I/O device(s) that communicate with the computing system 400. The ICH 420 may communicate with a bus 422 through a peripheral bridge (or controller) 424, such as a peripheral component interconnect (PCI) bridge, a universal serial bus (USB) controller, or other types of peripheral bridges or controllers. The bridge 424 may provide a data path between the CPU 402 and peripheral devices. Other types of topologies may be utilized. Also, multiple buses may communicate with the ICH 420, e.g., through multiple bridges or controllers. Moreover, other peripherals in communication with the ICH 420 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 422 may communicate with an audio device 426, one or more disk drive(s) 428, and a network interface device 430 (which is in communication with the computer network 403). Other devices may communicate via the bus 422. Also, various components (such as the network interface device 430) may communicate with the MCH 408 in some embodiments of the invention. In addition, the processor 402 and one or more other components discussed herein may be combined to form a single chip (e.g., to provide a System on Chip (SOC)). Furthermore, the graphics accelerator 416 may be included within the MCH 408 in other embodiments of the invention.

Furthermore, the computing system 400 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 428), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 5:
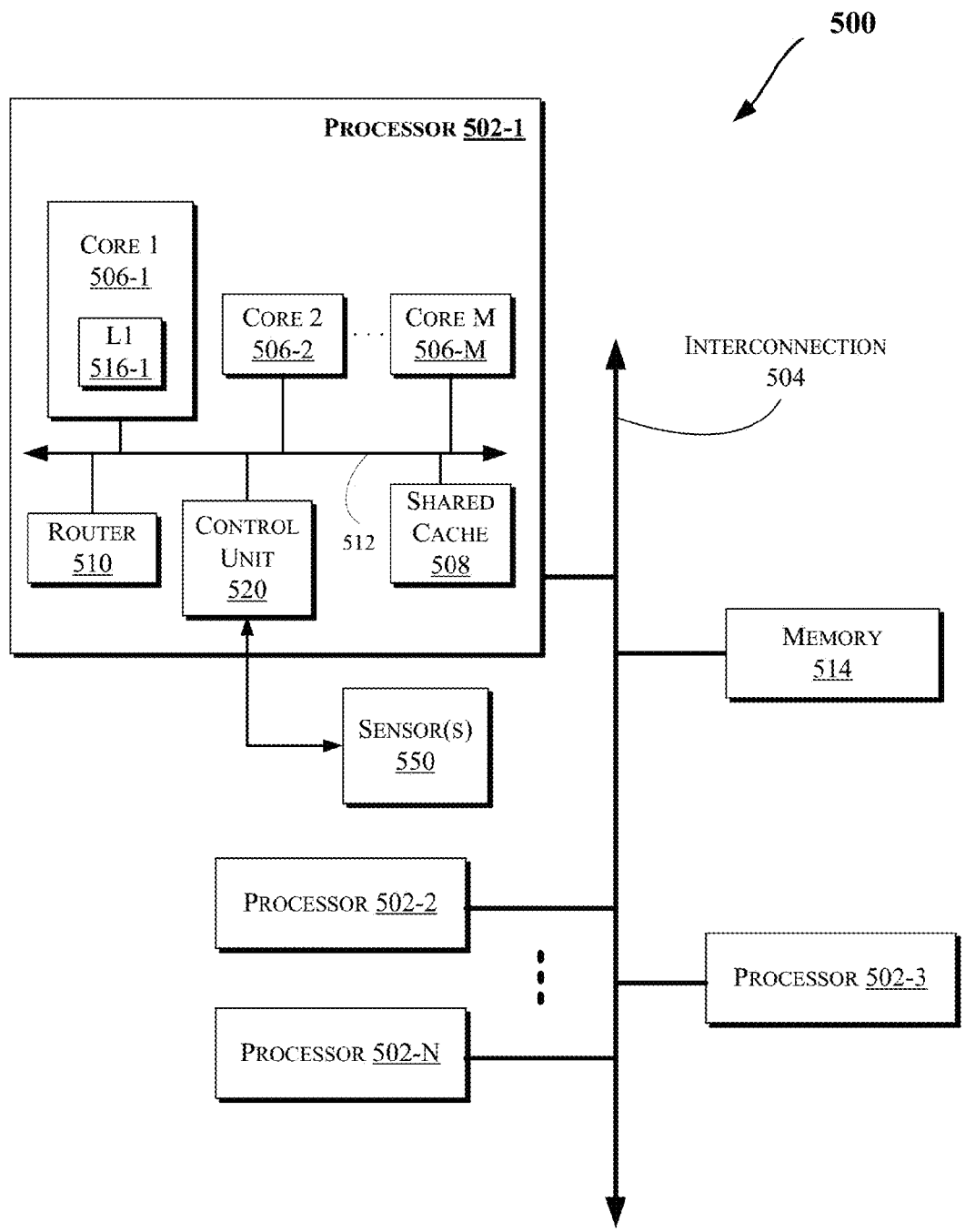

FIG. 5 illustrates a block diagram of a computing system 500, according to an embodiment of the invention. The system 500 may include one or more processors 502-1 through 502-N (generally referred to herein as "processors 502" or "processor 502"). The processors 502 may communicate via an interconnection network or bus 504. Each processor may include various components some of which are only discussed with reference to processor 502-1 for clarity. Accordingly, each of the remaining processors 502-2 through 502-N may include the same or similar components discussed with reference to the processor 502-1.

In an embodiment, the processor 502-1 may include one or more processor cores 506-1 through 506-M (referred to herein as "cores 506" or more generally as "core 506"), a shared cache 508, a router 510, and/or a processor control logic or unit 520. The processor cores 506 may be implemented on a single integrated circuit (IC) chip. Moreover, the chip may include one or more shared and/or private caches (such as cache 508), buses or interconnections (such as a bus or interconnection network 512), memory controllers (such as those discussed with reference to FIGS. 4-5), or other components.

In one embodiment, the router 510 may be used to communicate between various components of the processor 502-1 and/or system 500. Moreover, the processor 502-1 may include more than one router 510. Furthermore, the multitude of routers 510 may be in communication to enable data routing between various components inside or outside of the processor 502-1.

The shared cache 508 may store data (e.g., including instructions) that are utilized by one or more components of the processor 502-1, such as the cores 506. For example, the shared cache 508 may locally cache data stored in a memory 514 for faster access by components of the processor 502. In an embodiment, the cache 508 may include a mid-level cache (such as a level 2 (L2), a level 3 (L3), a level 4 (L4), or other levels of cache), a last level cache (LLC), and/or combinations thereof. Moreover, various components of the processor 502-1 may communicate with the shared cache 508 directly, through a bus (e.g., the bus 512), and/or a memory controller or hub. As shown in FIG. 5, in some embodiments, one or more of the cores 506 may include a level 1 (L1) cache 516-1 (generally referred to herein as "L1 cache 516"). In one embodiment, the controller 520 may include logic to implement the operations described above with reference to FIG. 3.

Figure 6:
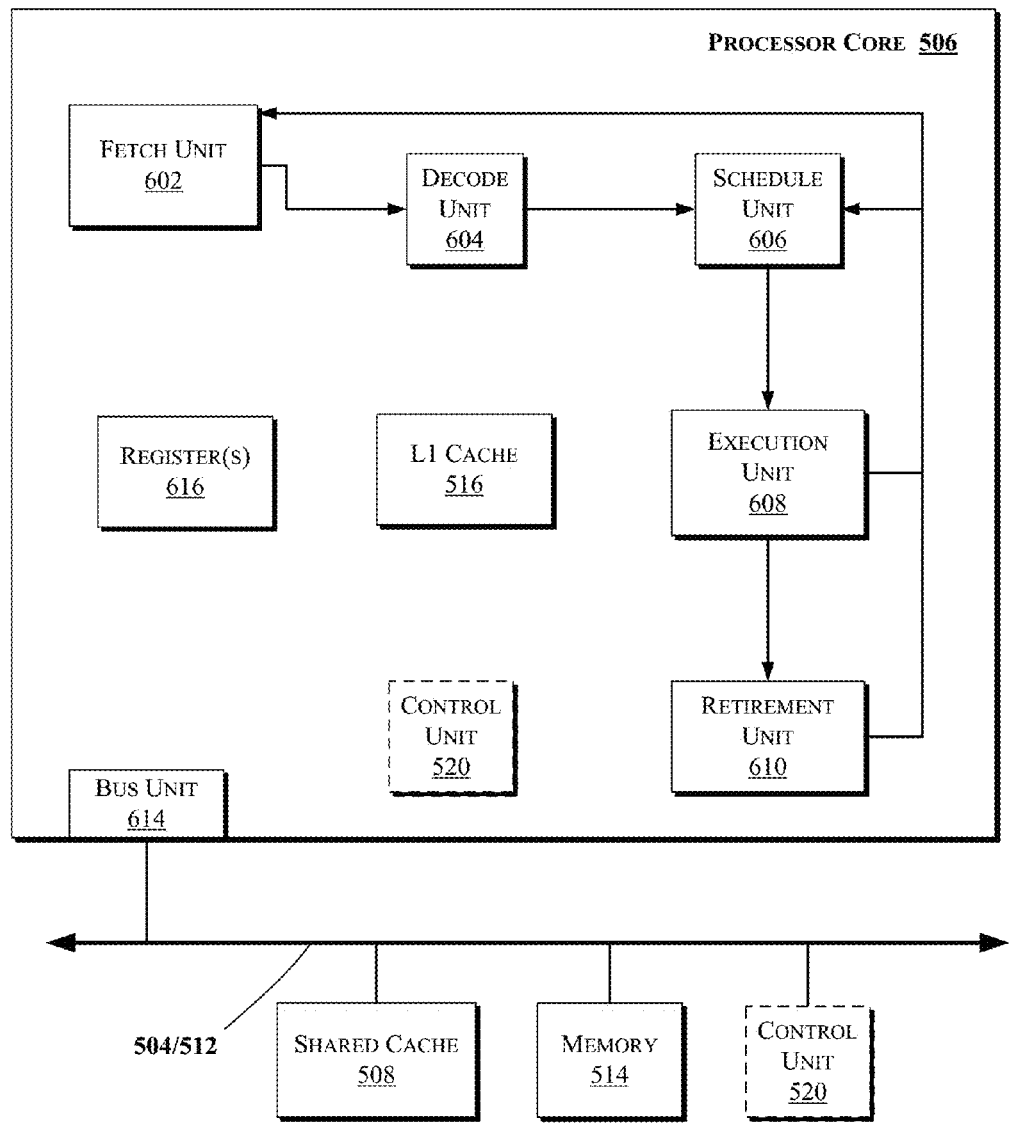

FIG. 6 illustrates a block diagram of portions of a processor core 506 and other components of a computing system, according to an embodiment of the invention. In one embodiment, the arrows shown in FIG. 6 illustrate the flow direction of instructions through the core 106. One or more processor cores (such as the processor core 106) may be implemented on a single integrated circuit chip (or die) such as discussed with reference to FIG. 5. Moreover, the chip may include one or more shared and/or private caches (e.g., cache 508 of FIG. 5), interconnections (e.g., interconnections 504 and/or 112 of FIG. 5), control units, memory controllers, or other components.

As illustrated in FIG. 6, the processor core 506 may include a fetch unit 602 to fetch instructions (including instructions with conditional branches) for execution by the core 606. The instructions may be fetched from any storage devices such as the memory 514. The core 506 may also include a decode unit 604 to decode the fetched instruction. For instance, the decode unit 604 may decode the fetched instruction into a plurality of uops (micro-operations).

Additionally, the core 606 may include a schedule unit 606. The schedule unit 606 may perform various operations associated with storing decoded instructions (e.g., received from the decode unit 604) until the instructions are ready for dispatch, e.g., until all source values of a decoded instruction become available. In one embodiment, the schedule unit 606 may schedule and/or issue (or dispatch) decoded instructions to an execution unit 608 for execution. The execution unit 608 may execute the dispatched instructions after they are decoded (e.g., by the decode unit 604) and dispatched (e.g., by the schedule unit 606). In an embodiment, the execution unit 608 may include more than one execution unit. The execution unit 608 may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit 608.

Further, the execution unit 608 may execute instructions out-of-order. Hence, the processor core 506 may be an out-of-order processor core in one embodiment. The core 506 may also include a retirement unit 610. The retirement unit 610 may retire executed instructions after they are committed. In an embodiment, retirement of the executed instructions may result in processor state being committed from the execution of the instructions, physical registers used by the instructions being de-allocated, etc.

The core 106 may also include a bus unit 614 to enable communication between components of the processor core 506 and other components (such as the components discussed with reference to FIG. 6) via one or more buses (e.g., buses 604 and/or 612). The core 106 may also include one or more registers 616 to store data accessed by various components of the core 506 (such as values related to power consumption state settings).

Furthermore, even though FIG. 5 illustrates the control unit 520 to be coupled to the core 506 via interconnect 512, in various embodiments the control unit 520 may be located elsewhere such as inside the core 506, coupled to the core via bus 504, etc.

Figure 7:
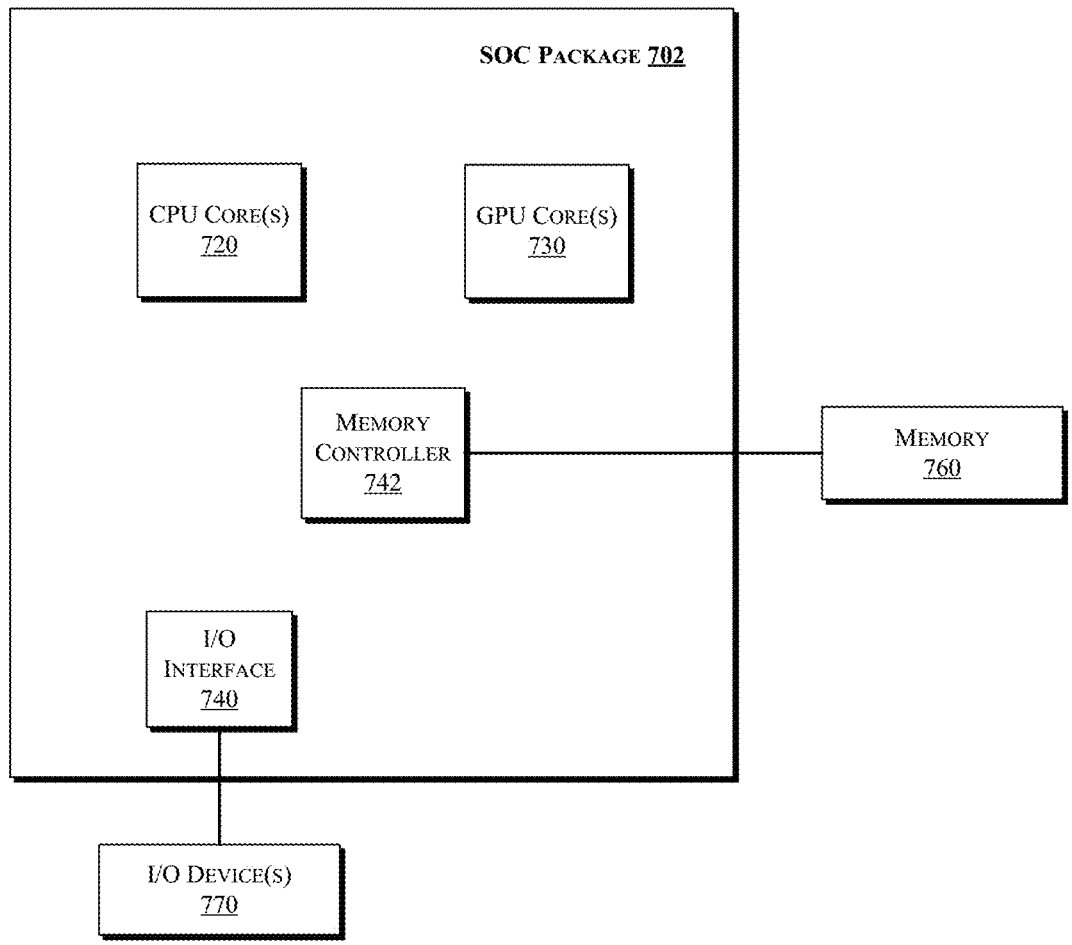

In some embodiments, one or more of the components discussed herein can be embodied as a System On Chip (SOC) device. FIG. 7 illustrates a block diagram of an SOC package in accordance with an embodiment. As illustrated in FIG. 7, SOC 702 includes one or more Central Processing Unit (CPU) cores 720, one or more Graphics Processor Unit (GPU) cores 730, an Input/Output (I/O) interface 740, and a memory controller 742. Various components of the SOC package 702 may be coupled to an interconnect or bus such as discussed herein with reference to the other figures. Also, the SOC package 702 may include more or less components, such as those discussed herein with reference to the other figures. Further, each component of the SOC package 720 may include one or more other components, e.g., as discussed with reference to the other figures herein. In one embodiment, SOC package 702 (and its components) is provided on one or more Integrated Circuit (IC) die, e.g., which are packaged into a single semiconductor device.

As illustrated in FIG. 7, SOC package 702 is coupled to a memory 760 (which may be similar to or the same as memory discussed herein with reference to the other figures) via the memory controller 742. In an embodiment, the memory 760 (or a portion of it) can be integrated on the SOC package 702.

The I/O interface 740 may be coupled to one or more I/O devices 770, e.g., via an interconnect and/or bus such as discussed herein with reference to other figures. I/O device(s) 770 may include one or more of a keyboard, a mouse, a touchpad, a display, an image/video capture device (such as a camera or camcorder/video recorder), a touch screen, a speaker, or the like.

The following pertain to further examples.

Example 1 is a hinge assembly comprising a first hinge pin rotatable about a first axis, a first gear coupled to the first hinge pin and rotatable about the first axis, a second hinge pin rotatable about a second axis substantially parallel to the first axis, a second gear coupled to the second hinge pin and rotatable about the second axis, at least one connecting member to be coupled to the first hinge pin and the second hinge pin to hold the first hinge pin at a fixed distance from the second hinge pin such that the first gear is engaged with the second gear, wherein at least one of the first gear or the second gear comprises a variable radius.

In Example 2, the subject matter of Example 1 can optionally include an arrangement in which a mounting bracket coupled to at least one of the first hinge pin or the second hinge pin.

In Example 3, the subject matter of any one of Examples 1-2 can optionally include an arrangement in which the first hinge pin and the second hinge pin are rotatable though an angular range between zero and 360 degrees.

In Example 4, the subject matter of any one of Examples 1-3 can optionally include an arrangement in which the first gear comprises a first variable radius and the second gear comprises a second variable radius.

In Example 5, the subject matter of any one of Examples 1-4 can optionally include an arrangement in which the hinge assembly is rotatable between a first position having a first gear ratio between the first gear and the second gear and a second position having a second gear ratio between the first gear and the second gear.

In Example 6, the subject matter of any one of Examples 1-5 can optionally include an arrangement in which the first gear ratio is in a range between 1:4 and 1:1, and the second gear ratio is in a range between 1:1 and 1:4.

In Example 7, the subject matter of any one of Examples 1-6 can optionally include an arrangement in which a gear ratio between the first gear and the second gear changes continuously as the hinge assembly is rotated.

In Example 8, the subject matter of any one of Examples 1-7 can optionally include an arrangement in which the first gear has a first maximum radius and a first minimum radius, wherein the ratio of the first maximum radius to the first minimum radius is within a range between 1.5:1.0 and 3.0:1.0, and the second gear has a second maximum radius and a second minimum radius, wherein the ratio of the second maximum radius to the second minimum radius is within a range between 1.5:1.0 and 3.0:1.0.

Example 9 is a housing for an electronic device comprising a first section and a second section, and a hinge assembly comprising a first hinge pin rotatable about a first axis, a first gear coupled to the first hinge pin and rotatable about the first axis, a second hinge pin rotatable about a second axis substantially parallel to the first axis, a second gear coupled to the second hinge pin and rotatable about the second axis, at least one connecting member to be coupled to the first hinge pin and the second hinge pin to hold the first hinge pin at a fixed distance from the second hinge pin such that the first gear is engaged with the second gear, wherein at least one of the first gear or the second gear comprises a variable radius.

In Example 10, the subject matter of Example 9 can optionally include an arrangement in which a mounting bracket coupled to at least one of the first hinge pin or the second hinge pin.

In Example 11, the subject matter of any one of Examples 9-10 can optionally include an arrangement in which the first hinge pin and the second hinge pin are rotatable though an angular range between zero and 360 degrees.

In Example 12, the subject matter of any one of Examples 9-11 can optionally include an arrangement in which the first gear comprises a first variable radius and the second gear comprises a second variable radius.

In Example 13, the subject matter of any one of Examples 9-12 can optionally include an arrangement in which the hinge assembly is rotatable between a first position having a first gear ratio between the first gear and the second gear and a second position having a second gear ratio between the first gear and the second gear.

In Example 14, the subject matter of any one of Examples 9-13 can optionally include an arrangement in which the first gear ratio is in a range between 1:4 and 1:1, and the second gear ratio is in a range between 1:1 and 1:4.

In Example 15, the subject matter of any one of Examples 9-14 can optionally include an arrangement in which a gear ratio between the first gear and the second gear changes continuously as the hinge assembly is rotated.

In Example 16, the subject matter of any one of Examples 9-15 can optionally include an arrangement in which the first gear has a first maximum radius and a first minimum radius, wherein the ratio of the first maximum radius to the first minimum radius is within a range between 1.5:1.0 and 3.0:1.0, and the second gear has a second maximum radius and a second minimum radius, wherein the ratio of the second maximum radius to the second minimum radius is within a range between 1.5:1.0 and 3.0:1.0.

Example 17 is an electronic device, comprising at least one electronic component and a housing comprising a first section and a second section, and a hinge assembly comprising a first hinge pin rotatable about a first axis, a first gear coupled to the first hinge pin and rotatable about the first axis, a second hinge pin rotatable about a second axis substantially parallel to the first axis, a second gear coupled to the second hinge pin and rotatable about the second axis, at least one connecting member to be coupled to the first hinge pin and the second hinge pin to hold the first hinge pin at a fixed distance from the second hinge pin such that the first gear is engaged with the second gear, wherein at least one of the first gear or the second gear comprises a variable radius.

In Example 18, the subject matter of Example 17 can optionally include an arrangement in which a mounting bracket coupled to at least one of the first hinge pin or the second hinge pin.

In Example 19, the subject matter of any one of Examples 17-18 can optionally include an arrangement in which the first hinge pin and the second hinge pin are rotatable though an angular range between zero and 360 degrees.

In Example 20, the subject matter of any one of Examples 17-19 can optionally include an arrangement in which the first gear comprises a first variable radius and the second gear comprises a second variable radius.

In Example 21, the subject matter of any one of Examples 17-20 can optionally include an arrangement in which the hinge assembly is rotatable between a first position having a first gear ratio between the first gear and the second gear and a second position having a second gear ratio between the first gear and the second gear.

In Example 22, the subject matter of any one of Examples 17-21 can optionally include an arrangement in which the first gear ratio is in a range between 1:4 and 1:1, and the second gear ratio is in a range between 1:1 and 1:4.

In Example 23, the subject matter of any one of Examples 17-22 can optionally include an arrangement in which a gear ratio between the first gear and the second gear changes continuously as the hinge assembly is rotated.

In Example 24, the subject matter of any one of Examples 17-23 can optionally include an arrangement in which the first gear has a first maximum radius and a first minimum radius, wherein the ratio of the first maximum radius to the first minimum radius is within a range between 1.5:1.0 and 3.0:1.0, and the second gear has a second maximum radius and a second minimum radius, wherein the ratio of the second maximum radius to the second minimum radius is within a range between 1.5:1.0 and 3.0:1.0.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and embodiments are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and embodiments are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and embodiments are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one embodiment" or "some embodiments" means that a particular feature, structure, or characteristic described in connection with the embodiment is included in at least an implementation. The appearances of the phrase "in one embodiment" in various places in the specification may or may not be all referring to the same embodiment.

Although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A housing for an electronic device, comprising:
    a first section and a second section; and
    a hinge assembly to couple the first section and the second section, the hinge assembly comprising:
        a first hinge pin rotatable about a first axis;
        a first gear coupled to the first hinge pin and rotatable about the first axis, wherein the first gear comprises a variable radius;
        a second hinge pin rotatable about a second axis substantially parallel to the first axis;
        a second gear coupled to the second hinge pin and rotatable about the second axis, wherein the second gear comprises a variable radius;
        at least one connecting member to be coupled to the first hinge pin and the second hinge pin comprising a first indent to hold the first hinge pin at a first location and a second indent to hold the second hinge pin at a second location such that the first hinge pin is at a fixed distance from the second hinge pin such that the first gear is engaged with the second gear,
        wherein the first hinge pin and the second hinge pin are positioned in the connecting member such that when the hinge assembly is in a first position the second gear exerts a first torque on the first gear and when the hinge assembly is rotated to the second position the second gear exerts a second torque on the first gear, wherein the second torque is greater than the first torque.

2. The housing of claim 1, further comprising:
a mounting bracket coupled to at least one of the first hinge pin or the second hinge pin.

3. The housing of claim 1, wherein:
the first gear comprises a first variable radius and the second gear comprises a second variable radius.

4. The housing of claim 1, wherein:
the hinge assembly is rotatable between a first position having a first gear ratio between the first gear and the second gear and a second position having a second gear ratio between the first gear and the second gear.

5. The housing of claim 4, wherein:
the first gear ratio is in a range between 1:4 and 1:1; and
the second gear ratio is in a range between 1:1 and 1:4.

6. The housing of claim 4, wherein a gear ratio between the first gear and the second gear changes continuously as the hinge assembly is rotated.

7. The housing of claim 1, wherein:
the first gear has a first maximum radius and a first minimum radius, wherein the ratio of the first maximum radius to the first minimum radius is within a range between 1.5:1.0 and 3.0:1.0; and
the second gear has a second maximum radius and a second minimum radius, wherein the ratio of the second maximum radius to the second minimum radius is within a range between 1.5:1.0 and 3.0:1.0.

8. An electronic device, comprising:
at least one electronic component; and
a housing comprising:
a first section and a second section; and
a hinge assembly to couple the first section and the second section, the hinge assembly comprising:
a first hinge pin rotatable about a first axis;
a first gear coupled to the first hinge pin and rotatable about the first axis, wherein the first gear comprises a variable radius;
a second hinge pin rotatable about a second axis substantially parallel to the first axis;
a second gear coupled to the second hinge pin and rotatable about the second axis, wherein the second gear comprises a variable radius;
at least one connecting member to be coupled to the first hinge pin and the second hinge pin comprising a first indent to hold the first hinge pin at a first location and a second indent to hold the second hinge pin at a second location such that the first hinge pin is at a fixed distance from the second hinge pin such that the first gear is engaged with the second gear,
wherein the first hinge pin and the second hinge pin are positioned in the connecting member such that when the hinge assembly is in a first position the second gear exerts a first torque on the first gear and when the hinge assembly is rotated to the second position the second gear exerts a second torque on the first gear, wherein the second torque is greater than the first torque.

9. The electronic device of claim 8 wherein:
further comprising:
a mounting bracket coupled to at least one of the first hinge pin or the second hinge pin.

10. The electronic device of claim 8, wherein:
the first gear comprises a first variable radius and the second gear comprises a second variable radius.

11. The electronic device of claim 8, wherein:
the hinge assembly is rotatable between a first position having a first gear ratio between the first gear and the second gear and a second position having a second gear ratio between the first gear and the second gear.

12. The electronic device of claim 11, wherein:
the first gear ratio is in a range between 1:4 and 1:1; and
the second gear ratio is in a range between 1:1 and 1:4.

13. The electronic device of claim 11, wherein a gear ratio between the first gear and the second gear changes continuously as the hinge assembly is rotated.

14. The electronic device of claim 8, wherein:
the first gear has a first maximum radius and a first minimum radius, wherein the ratio of the first maximum radius to the first minimum radius is within a range between 1.5:1.0 and 3.0:1.0; and
the second gear has a second maximum radius and a second minimum radius, wherein the ratio of the second maximum radius to the second minimum radius is within a range between 1.5:1.0 and 3.0:1.0.

* * * * *